(12) United States Patent
Natanzon

(10) Patent No.: US 9,275,063 B1
(45) Date of Patent: Mar. 1, 2016

(54) REPLICATION OPTIMIZATED IO

(75) Inventor: Assaf Natanzon, Ramat-Gan (IL)

(73) Assignee: EMC Corporation, Hopkinton, MA (US)

( * ) Notice: Subject to any disclaimer, the term of this patent is extended or adjusted under 35 U.S.C. 154(b) by 930 days.

(21) Appl. No.: 13/249,370

(22) Filed: Sep. 30, 2011

(51) Int. Cl.
*G06F 17/30* (2006.01)
(52) U.S. Cl.
CPC .............................. *G06F 17/30132* (2013.01)
(58) Field of Classification Search
CPC .......................... G06F 17/302; G06F 17/30902
USPC .......................................... 707/610, 637, 658
See application file for complete search history.

(56) References Cited

U.S. PATENT DOCUMENTS

| 7,958,093 | B2 * | 6/2011 | Anderson et al. | 707/662 |
| 2006/0161635 | A1 * | 7/2006 | Lamkin et al. | 709/217 |
| 2007/0266053 | A1 * | 11/2007 | Ahal et al. | 707/200 |
| 2008/0082591 | A1 * | 4/2008 | Ahal et al. | 707/204 |
| 2013/0036265 | A1 * | 2/2013 | Bert et al. | 711/113 |
| 2013/0080679 | A1 * | 3/2013 | Bert | 711/102 |

OTHER PUBLICATIONS

Lucas Mearian; "EMC automates data tiering across all primary array lines"; Comuterworld; Dec. 8, 2009; 3 pages.*
EMC; "Fast and Virtual LUN for Oracle Database and EMC Symmetrix V-Max with Enginuity 5874", published by Applied Technology, dated Apr. 2010, pp. 1-34.*

* cited by examiner

*Primary Examiner* — Monica Pyo
(74) *Attorney, Agent, or Firm* — Krishnendu Gupta; Joseph D'Angelo

(57) ABSTRACT

A system method and program product for data replication comprising based on metadata, creating a mapping of pending IO to a logical storage medium and changing a mapping of the logical storage medium to tiered storage mediums to optimize the pending IO to the logical storage medium.

21 Claims, 13 Drawing Sheets

REPLICATION OPTIMIZED IO

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

DESCRIPTION OF RELATED ART

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

A system method and program product for data replication comprising based on metadata, creating a mapping of pending IO to a logical storage medium and changing a mapping of the logical storage medium to tiered storage mediums to optimize the pending IO to the logical storage medium.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
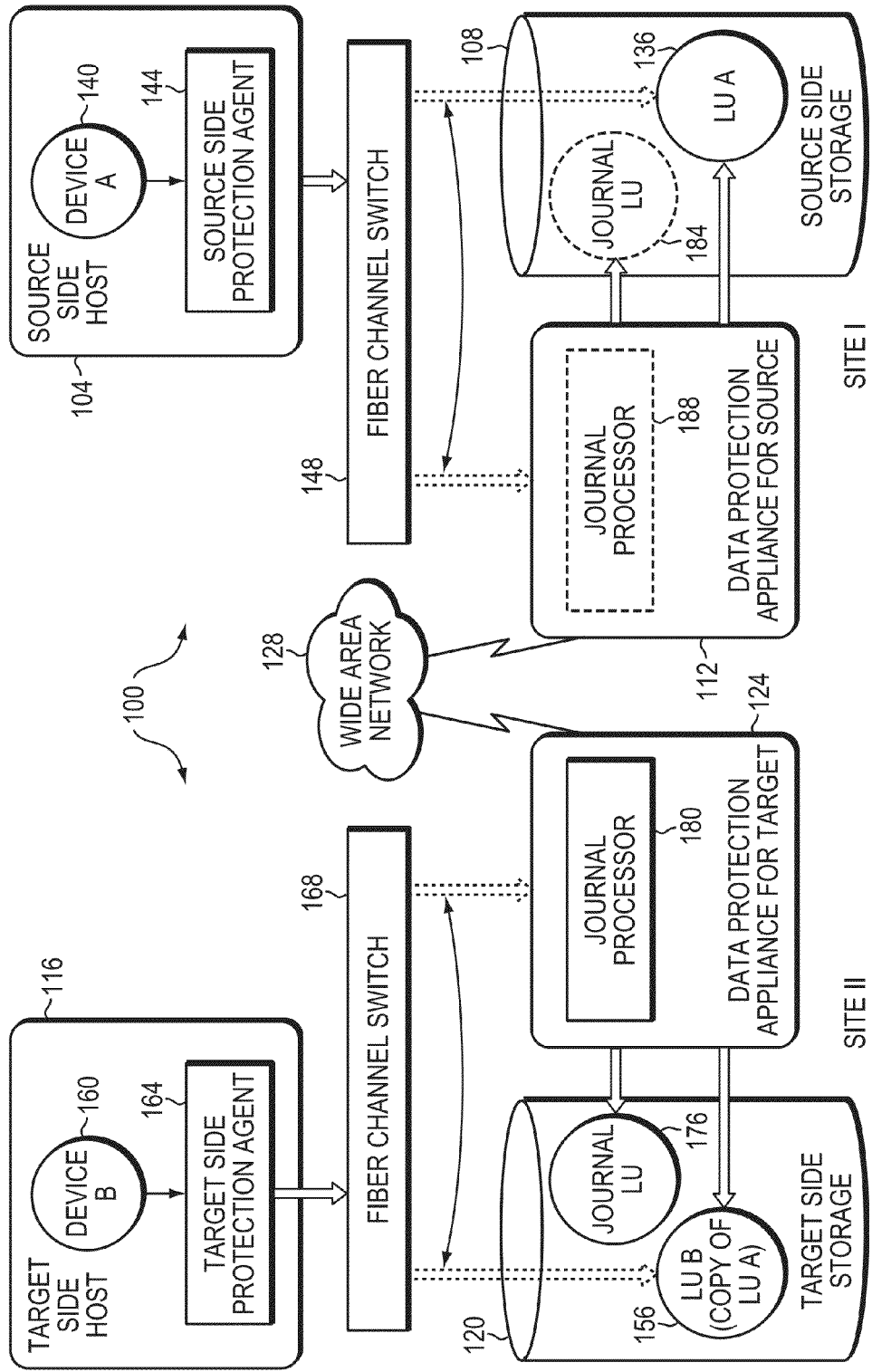
FIG. 1 is a simplified illustration of a data protection system, in accordance with an embodiment of the present disclosure.

Journal based replication typically provides a journal of the changes occurring on a production site. Conventionally, the journal may track both the changes that are to occur to a replication site that may not yet have been applied. Generally, the journal may also track the changes that have previously occurred to the replication and or production site.

In an embodiment of the current disclosure, the changes in the journal may be used to determine the locations of the I/O to be applied to the replication site. In some embodiments, a map of the locations to be read or written may be generated. In further embodiments, the knowledge of the read and write information may be used to move the corresponding IO to a higher tier or more quickly accessible type of storage. In other embodiments, the knowledge of read and writes may also be used to move colder or less accessed data to slower storage tiers. In further embodiments, based on the lag in the journal, the replication engine may notify the storage of the IO pattern for a given period of time, such as an hour, to provide near optimal storage tiering.

A traditional storage array (herein also referred to as a "disk storage array", "disk array", or simply "array") may be a collection of hard disk drives operating together logically as a unified storage device. Storage arrays are typically designed to store large quantities of data. Storage arrays typically include one or more storage array processors (SPs), for handling both requests for allocation and input/output (I/O) requests. An SP may be the controller for and primary interface to the storage array.

Performance of a storage array may be characterized by the array's total capacity, response time, and throughput. The capacity of a storage array may be the maximum total amount of data that can be stored on the array. The response time of an array may be the amount of time that it takes to read data from or write data to the array. The throughput of an array may be a measure of the amount of data that can be transferred into or out of (i.e., written to or read from) the array over a given period of time.

The administrator of a storage array may desire to operate the array in a manner that maximizes throughput and minimizes response time. In general, performance of a storage array may be constrained by both physical and temporal constraints. Examples of physical constraints include bus occupancy and availability, excessive disk arm movement, and uneven distribution of load across disks. Examples of temporal constraints include bus bandwidth, bus speed, spindle rotational speed, serial versus parallel access to multiple read/write heads, and the size of data transfer buffers.

One factor that may limit the performance of a storage array may be the performance of each individual storage component. For example, the read access time of a disk storage array may be constrained by the access time of the disk drive from which the data may be being read. Read access time may be affected by physical characteristics of the disk drive, such as the number of revolutions per minute of the spindle: the faster the spin, the less time it takes for the sector being read to come around to the read/write head. The placement of the data on the platter also affects access time, because it takes time for the arm to move to, detect, and properly orient itself over the proper track (or cylinder, for multihead/multiplatter drives). Reducing the read/write arm swing reduces the access time. Finally, the type of drive interface may have a significant impact on overall disk array storage. For example, a multihead drive that supports reads or writes on all heads in parallel will have a much greater throughput than a multihead drive that allows only one head at a time to read or write data.

Furthermore, even if a disk storage array uses the fastest disks available, the performance of the array may be unnecessarily limited if only one of those disks may be accessed at a time. In other words, performance of a storage array, whether it may be an array of disks, tapes, flash drives, or other storage entities, may also be limited by system constraints, such the number of data transfer buses available in the system and the density of traffic on each bus.

Storage arrays are typically used to provide storage space for one or more computer file systems, databases, applications, and the like. For this and other reasons, it may be common for storage arrays to be logically partitioned into chunks of storage space, called logical units, or LUs. This allows a unified storage array to appear as a collection of separate file systems, network drives, and/or Logical Units.

The Storage Array keeps track of the logical unit to physical unit associate in a map. The map associates a host logical unit address with a physical device address. The size of the elements in the map may be the coarseness of the map. A map that only has a few entries of large extents may be a course grain map. A map that has many entries with small extents may be a fine grain map. Fine grain map allow more flexibility but generally are too large for all of it to be contained in memory at once. It may be possible to use different mapping granularities for different data to achieve a variety of space/performance trade offs.

Large storage arrays today manage many disks which have historically been identical. However it is possible to use different types of disks and group the like kinds of disks into Tiers based on the performance characteristics of the disks. A group of fast but small disks may be a fast Tier. As well, a group of solid state drives could be another fast Tier. A group of slow but large disks may be a slow Tier. It may be possible to have other Tiers with other properties or constructed from a mix of other disks to achieve a performance or price goal. Storing often referenced, or hot, data on the fast Tier and less often referenced, or cold, data on the slow tier may create a more favorable customer cost profile than storing all data on a single kind of disk.

In addition to a storage tier, there may be a construct referred to as a storage pool. A storage pool ("pool"), as in the case of a group of storage tiers, may be made up of devices with different performance and cost characteristics. As in the case of storage tiers, it may be advantageous to locate the hot or most accessed data to the devices within the storage pool with the best performance characteristics while storing the cold or least accessed data on the devices that have slower performance characteristics. This can lead to a lower cost system having both faster and slower devices, that can emulate the performance of a more expensive system having only faster storage devices.

The current techniques help present a way for the storage array to automatically differentiate the hot data from the cold data on a fine granularity basis while using a limited set of resources to manage what data is stored on what tier through migrating the data. By using a mixture of different types of disks the storage array can have a performance profile more like an array of all fast disk with a cost profile approaching an array with slow disks without customers having to expend time to categorize and manage tiers of storage. Current techniques can move, or migrate, data to the appropriate tier or devices within or between pools on a fine grain basis while using a rather limited set of resources to manage the tiering or devices in the pool.

Early approaches have either required the customer to only use a single kind of disk or for the customer to manage different tiers of disk by designing which data should be stored on which tier when the data storage definitions are created. Typically, having customers manually manage tiers or pools of storage requires the customer to do a lot of work to categorize their data and to create the storage definitions for where the different categories of storage should be put. Previous approaches required not only categorizing the data and manually placing the data on different tiers or pools, but also keeping the data classification up to date on an ongoing basis to react to changes in customer needs. Some previous approaches have created automated tiering mechanisms or pool management systems but they typically either operate with extremely course maps using course granularity of data or they require a lot of resources to track all the information. Conversely, the current techniques can track data for migration at the finest granularity that the storage system can track while using a small amount of resources.

Previously, tracking the access information related to the data that used a fine map had been problematic because of the large number of disk results in many entries in the map; e.g., it is not practical to keep track of all references to all data. These current techniques may take advantage of data organized into a hierarchy of storage sizes. All the storage space of a storage array may be grouped together to comprise the storage pool of the array. That pool of storage can be allocated a bucket of data at a time.

To add an entry, it may often be necessary to remove an entry. Entries are removed by finding an entry that has a low level temperature and has not been referenced recently. The hot list for most buckets may be rather small. Periodically the system may rank an ordering of buckets by temperature and it may migrate buckets of storage so that the hottest buckets are on the fast tiers and the cold buckets are on the slow tiers. Migrating a bucket of storage migrates all the drops in that bucket together.

When a single drop is referenced and the system updates the hot list entry for that drop, the system may check whether the temperature of that drop is more in line with another bucket than the current bucket. In that situation, a single drop may be migrated between buckets. The migration may move the hot list entry information to the new bucket as well. This may cause the hot drops to migrate out of a bucket so the bucket may get colder and the bucket may be migrated to a slow tier. This may result in combining hot drops together so they may form a hotter bucket that can be migrated to a fast tier. By constructing the hot list containing only a very small subset of the drops and basing the comparison of drop temperatures with bucket temperatures, the resources needed to handle the migration are kept to a minimum.

In certain embodiments, each LUN may be created from a storage pool which contains many types of devices for example a FAST pool can contain 5% very fast low latency EFD (enterprise flash drives) SSD drives, 20% slower fiber channel drives and 75% slow SATA drives. SSD devices may have access latency of 0.1 ms and below and allow high number of random IO. EFD drives may be very expensive, but an EFD drive may serve 10000-50000 IOPS, fiber channel disks rotate at 15000 RPM, access time is ~5 ms and can serve 200-400 IOPS. SATA drives may be less expensive and may be able to serve around 100 IOPS and access time may be around 10 ms.

Tiering FAST algorithms may ensure that data which is accessed most frequently and mainly in a random access mode may be stored on SSD and data which is rarely accessed will be stored on SATA drives, this may allow user to get high capacity devices, with high performance at an affordable price. In certain embodiments of the current disclosure, hints may be given FAST algorithms in order to get better performance from the storage array at the replica site.

Data Storage System Terminology

With respect to the current techniques in general, the following definitions may be particularly useful. A disk may be a physical disk within the storage system. A LUN may be a logical unit number which is an identifier for a Logical Unit. As well, each slice of data may have a mapping on the location of the physical drive where it starts and ends; a slice may be sliced again. A slice may also be divided into slivers.

Data migration, i.e., the moving of data from one storage element to another, may be performed at the LUN level, the slice level, or the sliver level. Data migration at the slice level may be performed using the current techniques which commonly copy the data then update the map with the new location. With respect to the current techniques, this may require adding temperature statistics to slices within pools. In addition to considering temperature distributions between tiers, slices may also be migrated within tiers to redistribute workload on disk. This type of slice migration may apply to both LUNs with either a fine or course map. Data migration using the current techniques may also occur at the sliver (i.e., block/page) level. This may require keeping statistics about the hot slivers in each slice and migrating the hot slivers out of cool slices. As well, cooler slices can be migrated to slower tier of storage.

The following definitions may also be employed throughout the specification and claims.

BACKUP SITE—may be a facility where replicated production site data is stored; the backup site may be located in a remote site or at the same location as the production site;

CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.

DPA—may be Data Protection Appliance a computer or a cluster of computers, or a set of processes that serve as a data protection appliance, responsible for data protection services including inter alia data replication of a storage system, and journaling of I/O requests issued by a host computer to the storage system;

RPA—may be replication protection appliance, is another name for DPA.

FAST—fully automated storage tiering, method which may allow automatic tiering of portions of a LU between different tiers automatically.

HOST—may be at least one computer or networks of computers that runs at least one data processing application that issues I/O requests to one or more storage systems; a host is an initiator with a SAN;

HOST DEVICE—may be an internal interface in a host, to a logical storage unit;

IMAGE—may be a copy of a logical storage unit at a specific point in time;

INITIATOR—may be a node in a SAN that issues I/O requests;

JOURNAL—may be a record of write transactions issued to a storage system; used to maintain a duplicate storage system, and to rollback the duplicate storage system to a previous point in time;

LOGICAL UNIT—may be a logical entity provided by a storage system for accessing data from the storage system;

LUN—may be a logical unit number for identifying a logical unit;

PHYSICAL STORAGE UNIT—may be a physical entity, such as a disk or an array of disks, for storing data in storage locations that can be accessed by address;

PRODUCTION SITE—may be a facility where one or more host computers run data processing applications that write data to a storage system and read data from the storage system;

SAN—may be a storage area network of nodes that send and receive I/O and other requests, each node in the network being an initiator or a target, or both an initiator and a target;

SOURCE SIDE—may be a transmitter of data within a data replication workflow, during normal operation a production site is the source side; and during data recovery a backup site is the source side;

SNAPSHOT—a Snapshot may refer to differential representations of an image, i.e. the snapshot may have pointers to the original volume, and may point to log volumes for changed locations. Snapshots may be combined into a snapshot array, which may represent different images over a time period.

STORAGE SYSTEM—may be a SAN entity that provides multiple logical units for access by multiple SAN initiators TARGET—may be a node in a SAN that replies to I/O requests;

TARGET SIDE—may be a receiver of data within a data replication workflow; during normal operation a back site is the target side, and during data recovery a production site is the target side;

WAN—may be a wide area network that connects local networks and enables them to communicate with one another, such as the Internet.

SPLITTER/PROTECTION AGENT: may be an agent running either on a production host a switch or a storage array which can intercept IO and split them to a DPA and to the storage array, fail IO redirect IO or do any other manipulation to the IO.

VIRTUAL VOLUME: may be a volume which is exposed to host by a virtualization layer, the virtual volume may be spanned across more than one site DISTRIBUTED MIRROR: may be a mirror of a volume across distance, either metro or geo, which is accessible at all sites.

BLOCK VIRTUALIZATION: may be a layer, which takes backend storage volumes and by slicing concatenation and striping create a new set of volumes, which serve as base volumes or devices in the virtualization layer MARKING ON SPLITTER: may be a mode in a splitter where intercepted IOs are not split to an appliance and the storage, but changes (meta data) are tracked in a list and/or a bitmap and I/O is immediately sent to down the IO stack.

FAIL ALL MODE: may be a mode of a volume in the splitter where all write and read IOs intercepted by the splitter are failed to the host, but other SCSI commands like read capacity are served.

GLOBAL FAIL ALL MODE: may be a mode of a volume in the virtual layer where all write and read IOs virtual layer are failed to the host, but other SCSI commands like read capacity are served.

LOGGED ACCESS: may be an access method provided by the appliance and the splitter, in which the appliance rolls the volumes of the consistency group to the point in time the user requested and let the host access the volumes in a copy on first write base.

VIRTUAL ACCESS: may be an access method provided by the appliance and the splitter, in which the appliance exposes a virtual volume from a specific point in time to the host, the data for the virtual volume is partially stored on the remote copy and partially stored on the journal.

CDP: Continuous Data Protection, may refer to a full replica of a volume or a set of volumes along with a journal which allows any point in time access, the CDP copy is at the same site, and maybe the same storage array of the production site CRR: Continuous Remote Replica may refer to a full replica of a volume or a set of volumes along with a journal which allows any point in time access at a site remote to the production volume and on a separate storage array.

As used herein, the term storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image.

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, which is hereby incorporated by reference.

A discussion of image access may be found in U.S. patent application Ser. No. 12/969,903 entitled "DYNAMIC LUN RESIZING IN A REPLICATION ENVIRONMENT" filed on Dec. 16, 2010 assigned to EMC Corp., which is hereby incorporated by reference.

A description of hinting and some techniques associated with hinting may be described in the patent applications titled STORAGE INTEGRATION PLUGIN FOR VIRTUAL SERVERS and A METHOD FOR DYNAMIC MANAGEMENT OF SYSTEM RESOURCES THROUGH APPLICATION HINTS with patent application Ser. Nos. 12/751,093 and 12/827,092 which are hereby incorporated by reference in their entirety.

A description of storage mediums of different speed and storage tiering and some techniques associated thereto may be described in the patent applications titled FACILITATING DATA MIGRATION BETWEEN TIERS and FINE GRAINED TIERED STORAGE WITH THIN PROVISIONING with patent application Ser. Nos. 12/494,622 and 11/823,156 which are hereby incorporated by reference in its entirety.

Description of Embodiments Using of a Five State Journaling Process

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.
Redirect the SCSI command to another logical unit.
Split the SCSI command by sending it first to the respective DPA. After the DPA returns an acknowledgement, send the SCSI command to its intended logical unit.
Fail a SCSI command by returning an error return code.
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 may host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal".

Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
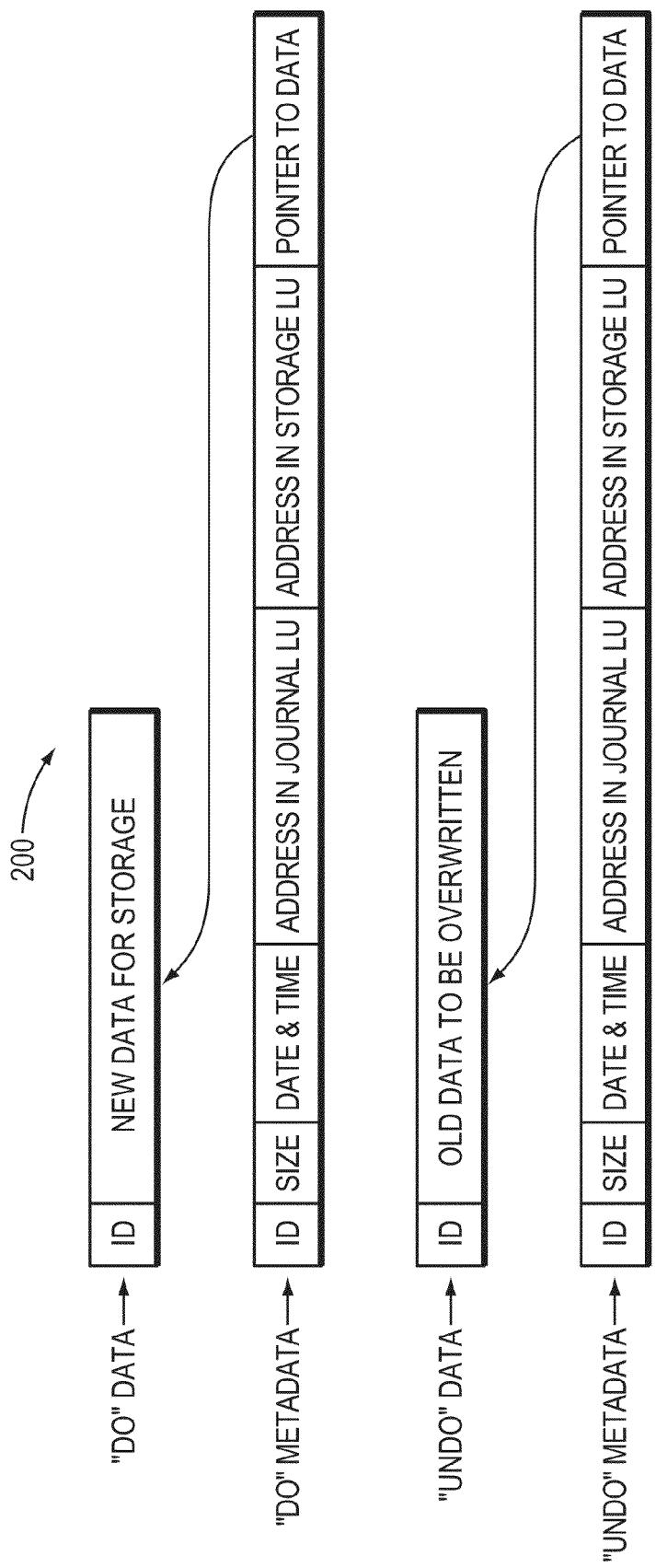
FIG. 2 is a simplified illustration of a write transaction for a journal, in accordance with an embodiment of the present disclosure.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
 one or more identifiers;
 a time stamp, which is the date & time at which the transaction was received by source side DPA 112;
 a write size, which is the size of the data block;
 a location in journal LU 176 where the data is entered;
 a location in LU B where the data is to be written; and
 the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a predefined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Delta Marking

A delta marker stream may contain the locations that may be different between the latest I/O data which arrived to the remote side (the current remote site) and the latest I/O data which arrived at the local side. In particular, the delta marking stream may include metadata of the differences between the source side and the target side. For example, every I/O reaching the data protection appliance for the source 112 may be written to the delta marking stream and data is freed from the delta marking stream when the data safely arrives at both the source volume of replication 108 and the remote journal 180 (e.g. DO stream). Specifically, during an initialization process no data may be freed from the delta marking stream; and only when the initialization process is completed and I/O data has arrived to both local storage and the remote journal data, may be I/O data from the delta marking stream freed. When the source and target are not synchronized, data may not be freed from the delta marking stream. The initialization process may start by merging delta marking streams of the target and the source so that the delta marking stream includes a list of all different locations between local and remote sites. For example, a delta marking stream at the target might have data too if a user has accessed an image at the target site.

The initialization process may create one virtual disk out of all the available user volumes. The virtual space may be divided into a selected number of portions depending upon the amount of data needed to be synchronized. A list of 'dirty' blocks may be read from the delta marker stream that is relevant to the area currently being synchronized to enable creation of a dirty location data structure. The system may begin synchronizing units of data, where a unit of data is a constant amount of dirty data, e.g., a data that needs to be synchronized.

The dirty location data structure may provide a list of dirty location until the amount of dirty location is equal to the unit size or until there is no data left. The system may begin a so-called ping pong process to synchronize the data. The process may transfer the differences between the production and replica site to the replica.

Splitting IO

Figure 3:
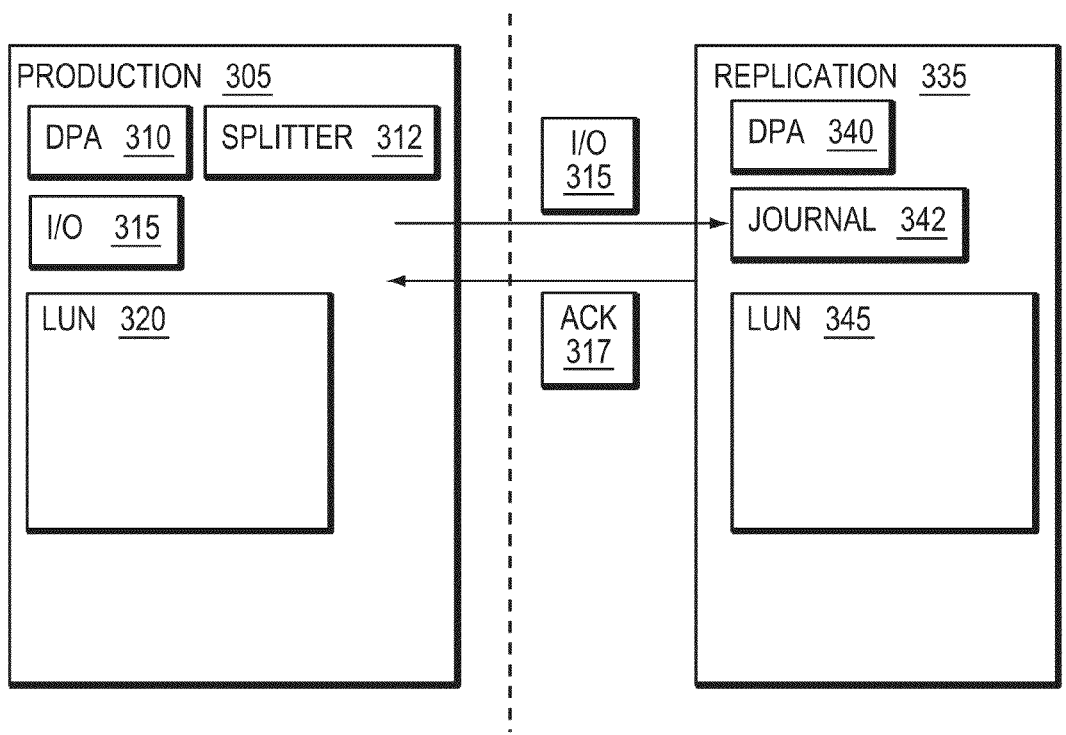
FIG. 3 is a simplified illustration of a production and replication site, in accordance with an embodiment of the present disclosure.
Figure 4:
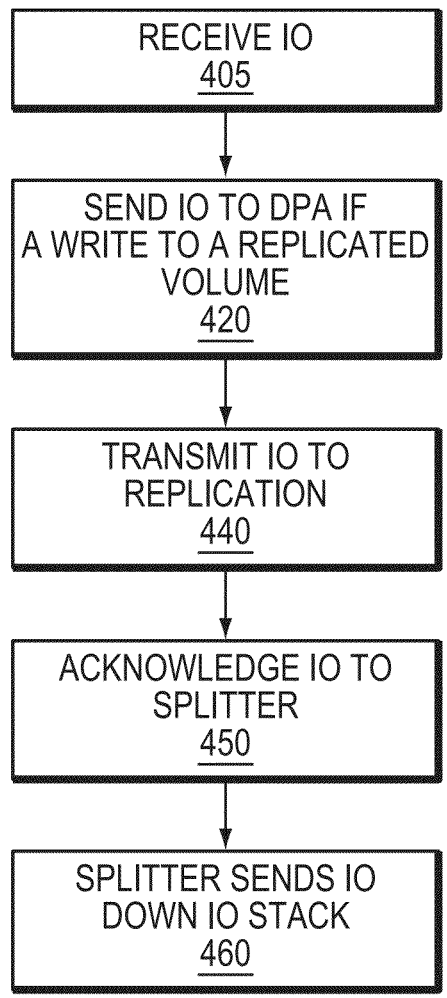
FIG. 4 is a simplified illustration of a method of splitting an IO, in accordance with an embodiment of the present disclosure.

Refer now to the example embodiment of FIGS. 3 and 4 which illustrate how IOs may be split at a production site, replicated, and sent to a replication site. An IO 315 is received at splitter 312 on production site 305 (step 405). If IO is a write to a volume being replicated, Splitter 312 sends IO to DPA 310 (step 420). DPA 310 may transmit IO 315 to replication site 335 (step 440). DPA 310 may acknowledge the IO to Splitter 312 (step 450). Splitter 312 may send IO 315 down the IO stack (Step 460).

In most embodiments, the replication site may have the changes applied to the production site stored in a journal on the replication site.

Replication LUN

Figure 5:
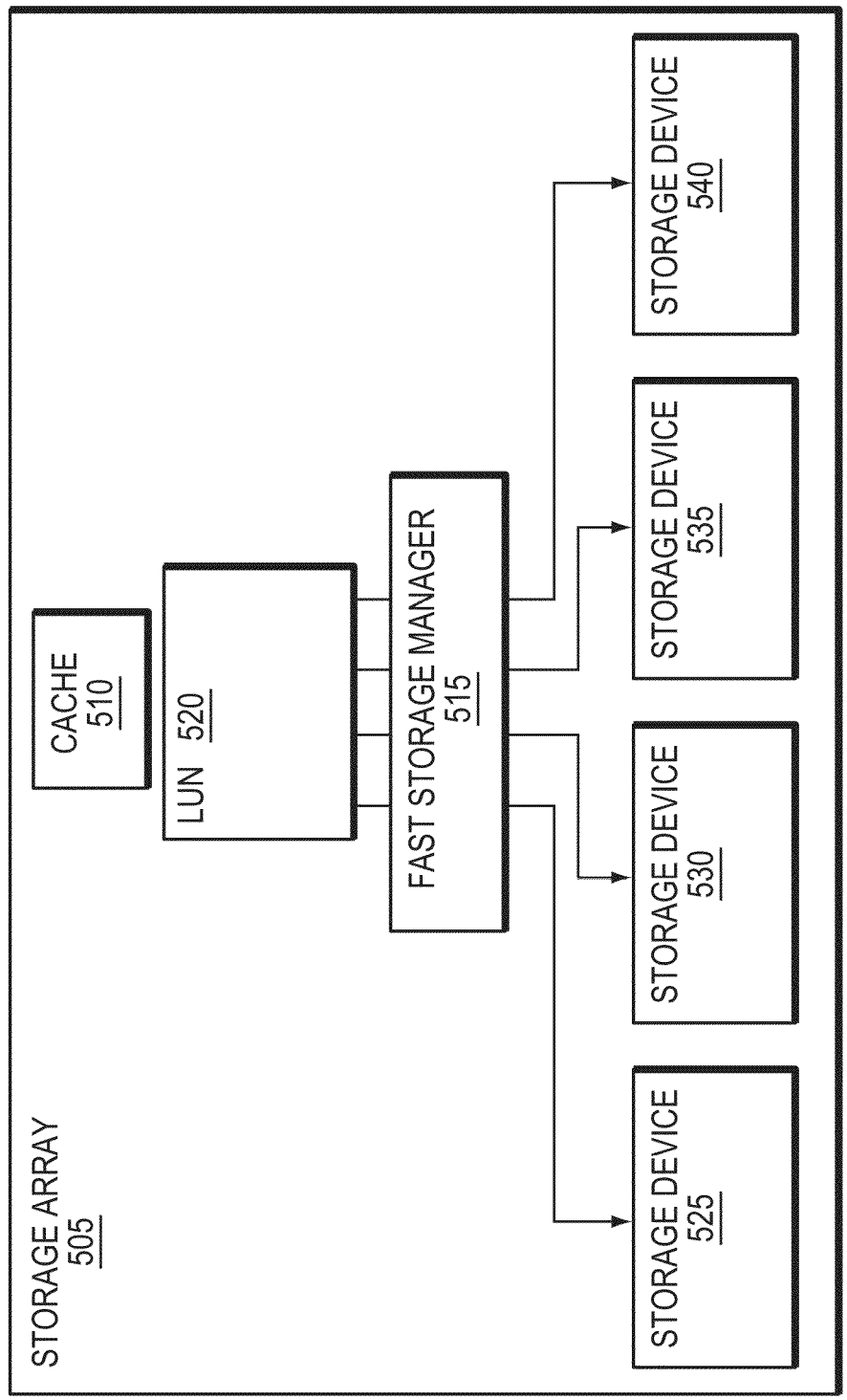
FIG. 5 is a simplified illustration of a storage array with tiers of storage devices, in accordance with an embodiment of the present disclosure.

Refer now to the example embodiment of FIG. 5. In the example of FIG. 5, there is a replication site 505. Replication site 505 may have cache 510 and LUN 520. Cache 510 may be used to service IO requests to LUN 520. LUN 520 may be logically mapped to physical or other logical storage devices 515, 530, 535, and 540, which may be referred to as a storage pool. Storage devices 515, 530, 535, and 540 may each have difference performance specifications. For example, storage device 525 may be able to read and write data at a rate much faster than storage device 540. The information stored on LUN 520 may be allocated to devices 525, 530, 535, and 530 in the storage pool. The information store on LUN 520 may be moved to different devices or tiers based on how the information is predicted to be accessed. Devices 525, 530, 535, 540 may also be used by other LUNs to store data.

DO and DO Meta Data

Figure 6:
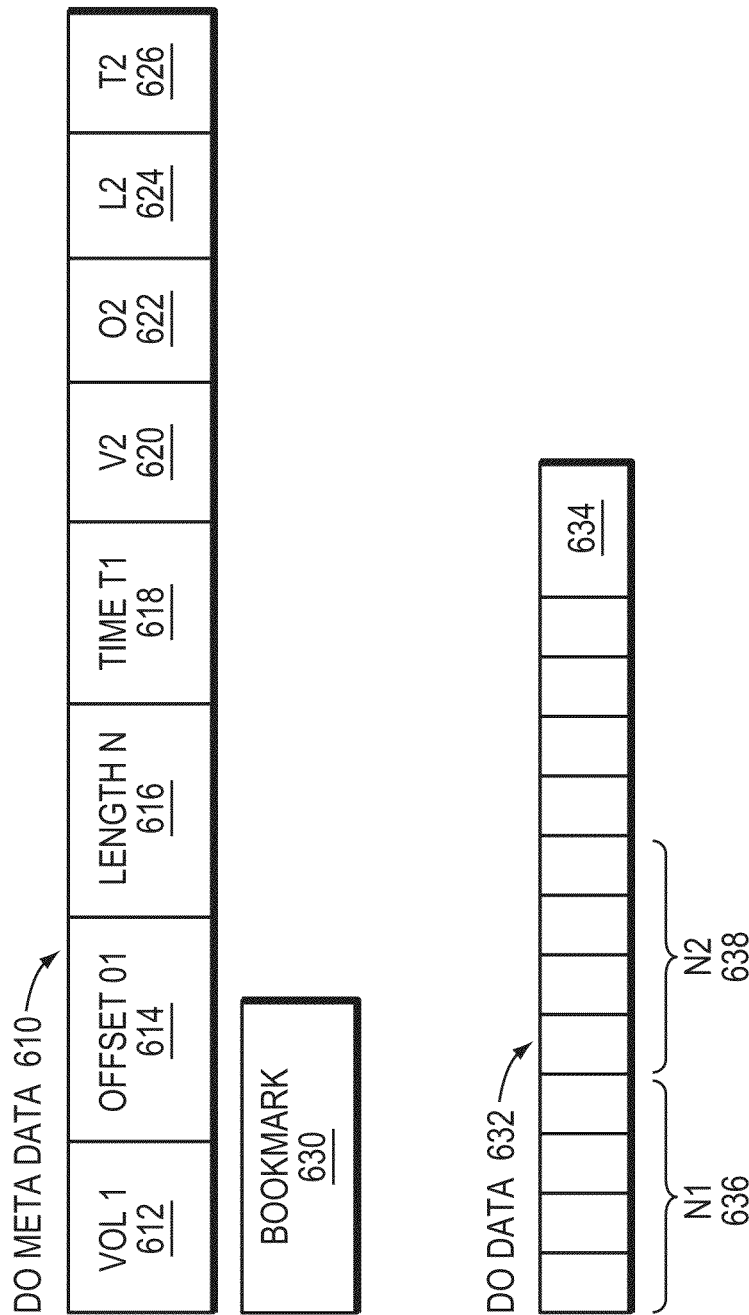
FIG. 6 is a simplified illustration of a Do Meta Data, a bookmark, and Do Data, in accordance with an embodiment of the present disclosure.

Refer now to the example embodiment of FIG. 6. FIG. 6 illustrates Do meta data and Do data stored in a journal. The Do meta data 610 may describe the writes that may be applied to the replication LUN. This meta data may provide a record of the IO to be applied to the replication LUN, including the target LUN of the IO, the offset of the IO and the size of the IO (and possibly some other meta data information). The Do stream may contain the data of the IOs.

The amount of data to be applied to the LUN, which may be in the Do stream, may also be referred to as a lag. In some embodiments, in asynchronous replication, the lag or amount of data in the journal may be set by the user. In other embodiments, the lag may fluctuate based on the amount of IO occurring on the production site.

Figure 7A:
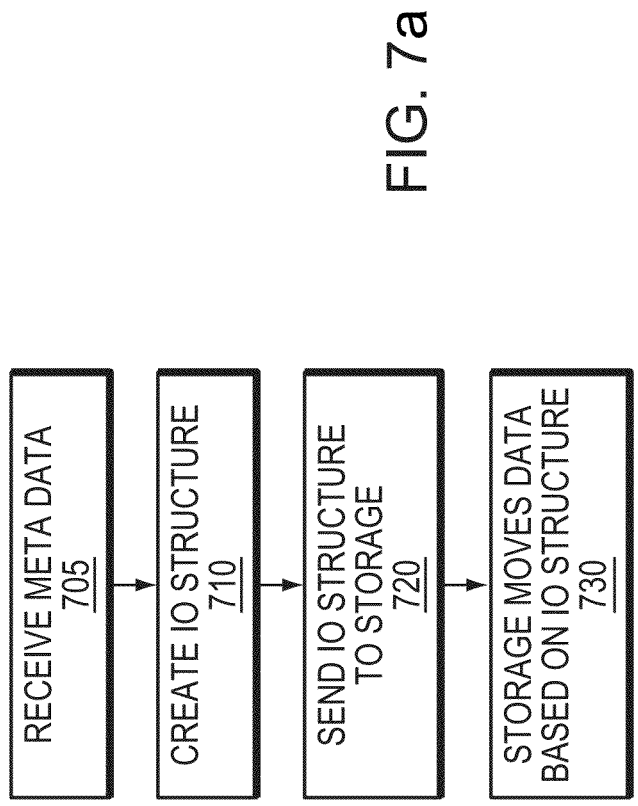
FIG. 7a is a simplified illustration of a creating an IO structure, in accordance with an embodiment of the present disclosure.

Refer now as well to the example embodiments of FIGS. 6 and 7a. In example embodiment of FIG. 7a, meta data 610 may be read (step 705). Meta data 610 may be used to create an IO structure (step 710). The structure may be used to denote the IO changes that may be applied to replica LUN. The IO structure may be sent to storage 515 (Step 720), and may be sent by a vendor specific SCSI command or through a storage API. Storage 515 may move data between tiers based on the IO structure.

Figure 7B:
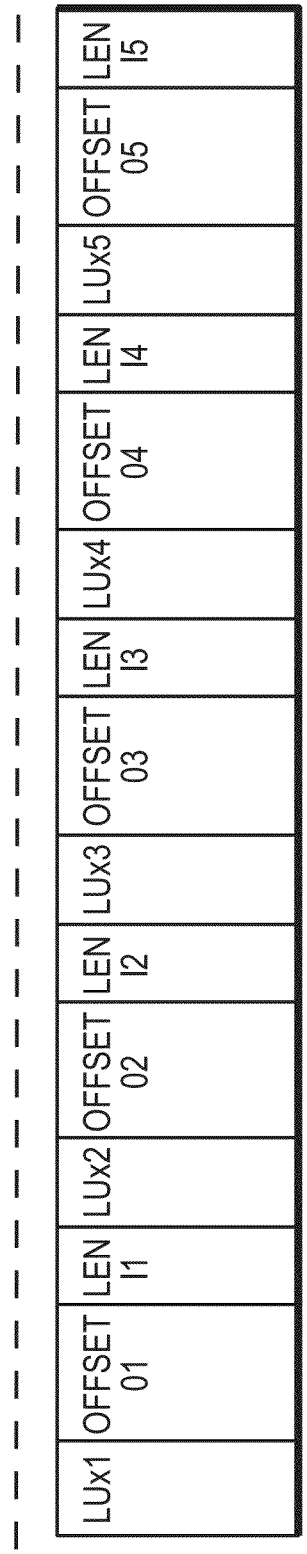
FIG. 7b is a simplified illustration of an IO structure, in accordance with an embodiment of the present disclosure.

In some embodiments, the IO structure may be a list of the locations to which IO will occur. In certain embodiments, the IO structure may contain the frequency of which IO may be written to the locations. In further embodiments, the IO structure may be a heat map of the IO. In at least some embodiments, the IO structure may be a map for each set of blocks (i.e. each mega byte) with a number indicating how many IOs are expected to happen in this area. Refer now to FIG. 7b which illustrates an example embodiment of an IO structure that contains information denoting where IO will occur on a given LUN and LUN sector.

Journal Based IO Optimizing IO

Figure 8:
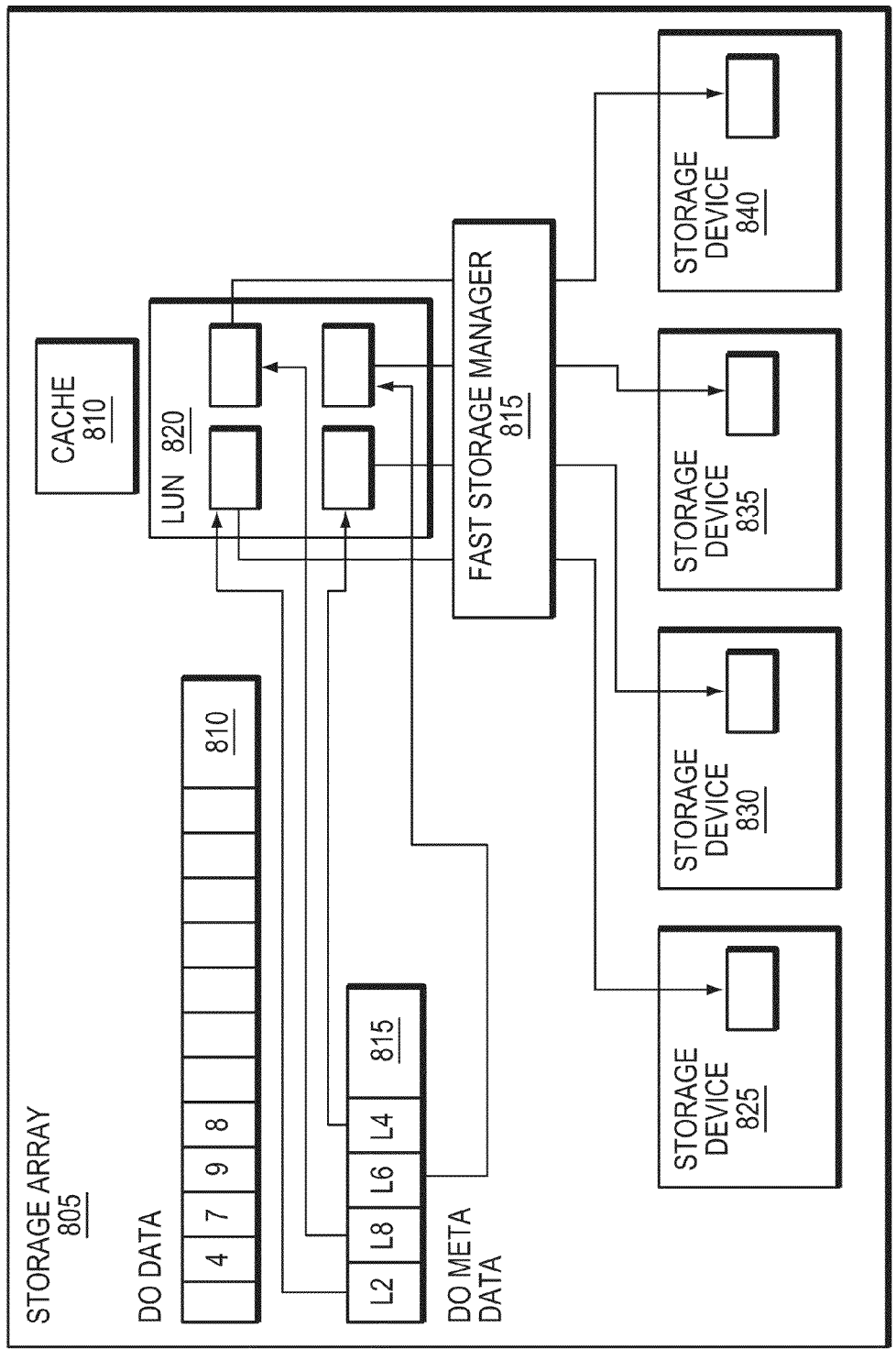
FIG. 8 is a simplified illustration of a storage array with tiers of storage devices and Do data and meta data, in accordance with an embodiment of the present disclosure.
Figure 9:
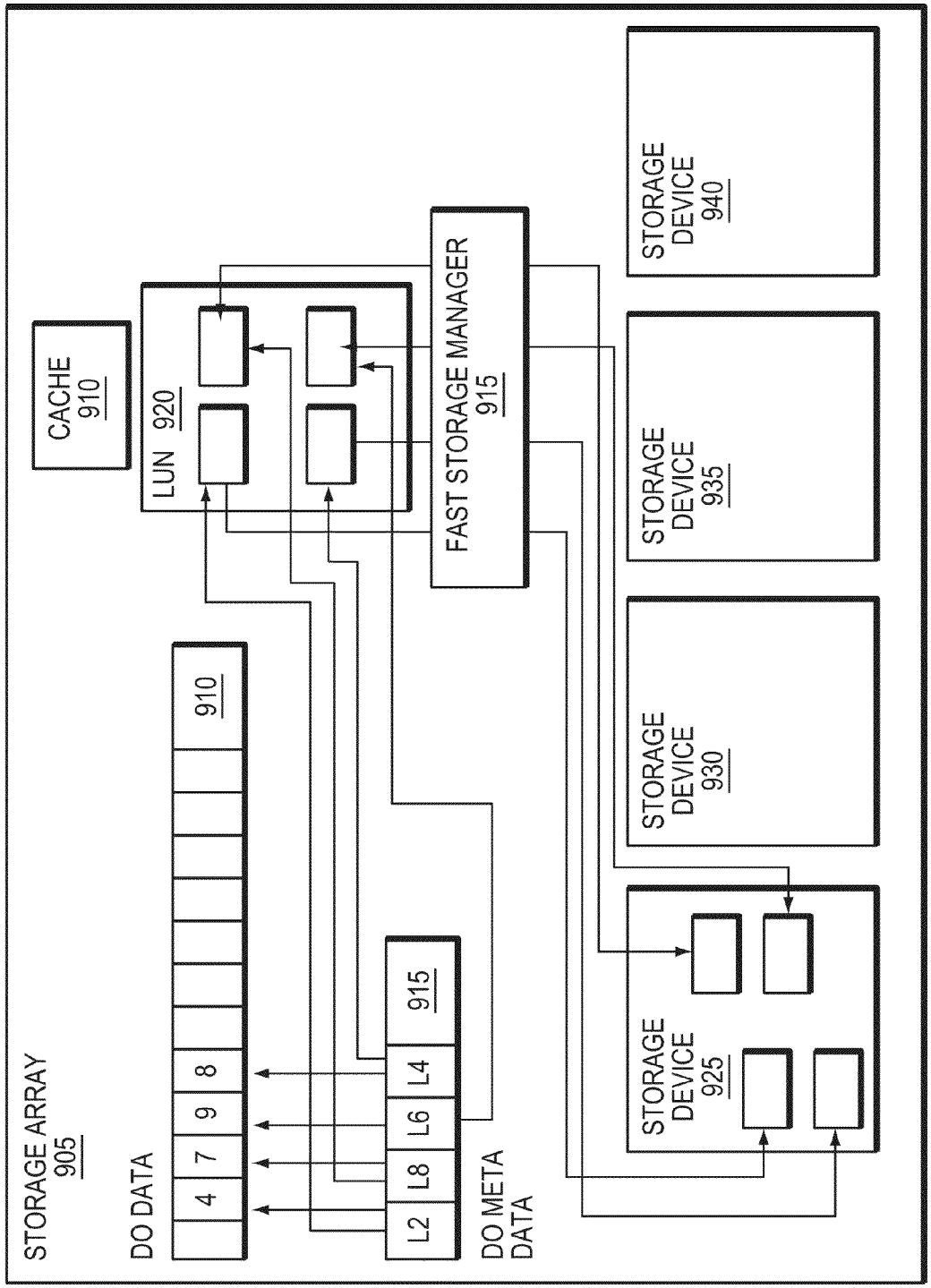
FIG. 9 is an alternative simplified illustration of a storage array with tiers of storage devices and Do data and meta data, in accordance with an embodiment of the present disclosure.

Refer now to the example embodiments of FIGS. 7a, 8, and 9. In the example embodiment of FIG. 7a, Do meta data 815 may indicate that data from Do data 810 may be written to locations L2, L8, L6, and L4 on LUN 820. LUN 820, may have a mapping of these locations to storage devices 815, 830, 835, and 840, each of which may have different IO speeds. Meta data 815 may be read (step 705). Meta data 815 may be used to create an IO structure (step 710). The structure may be used to denote all the IO changes that may be applied to replica LUN. The IO structure may be sent to the storage or a device coordinating where data is stored for LUN 820 (Step 720). The storage may move the data based on the IO structure.

Refer now to the example embodiment of FIG. 9. In the example embodiment of FIG. 9, locations L2, L8, L6, and L4 have been moved from storage devices 815, 830, 835, and 840 to storage device 925. Note, in this example, storage devices 815, 830, 835, and 840 are the same devices as storage devices 915, 930, 935, and 940. In this example, storage device 925 may be the fast storage device, able to handle the IO to these locations in the most efficient manner. Similarly, locations on LUN 920 which may not be accessed per the IO structure, may be moved to a slower storage device such as device 940. Additionally, in some embodiments, the location may be moved into cache 910 to further speed the IO.

In certain embodiments, the phase of writing the journal to the do stream may be optimized. In some embodiments, the IO to written to the journal may be sequential. In most embodiments, the IO written to the journal may be a large amount of IO. In at least some embodiments, the information about the journal may be used to have the journal kept on a SATA device. In further embodiments, the journal lag may be kept large enough to have an impact on performance, i.e. ensuring that that journal is large enough that a heat map or other predictive data structure, corresponding to IO to be applied to the storage, may provide the storage with the ability to move the impacted storage location to a faster device to increase IO speed. In certain embodiments, the IO lag may be at least 1 gigabyte. In certain embodiments, the IO lag may be calculated based on the performance characteristics of the underlying storage components and tiers.

In certain embodiments, the phase of reading from the journal may be optimized. In most embodiments, reading from the journal may be sequential and the next read in the journal may be a sequential read. In some embodiments, the storage may be notified to pre-fetch the beginning of the journal into a cache. In at least one embodiment, the notification may be a storage API command. In another embodiment, the notification may be a vendor specific command. In further embodiments, a certain amount of the journal, such as 1 gigabyte, may be moved to the storage cache. In still further embodiments, other pre-fetch algorithms may be used to pre-fetch the journal data. In certain embodiments, the journal may be partially sequential and a sufficient amount of the journal may need to be cached to enable access to the journal. In certain embodiments, the journal may be cached but may not be stored on a higher storage tier.

In other embodiments, writing to the undo data stream may be sequential. In certain embodiments, the RPA can notify the storage to keep the undo blocks on a lower storage tier. In further embodiments, writing data to the user volumes may be optimized. In certain embodiments, as the IO pattern for the user data to be written is known via the meta data, the locations where the IO is to be applied may be moved to a higher storage tier.

Figure 10:
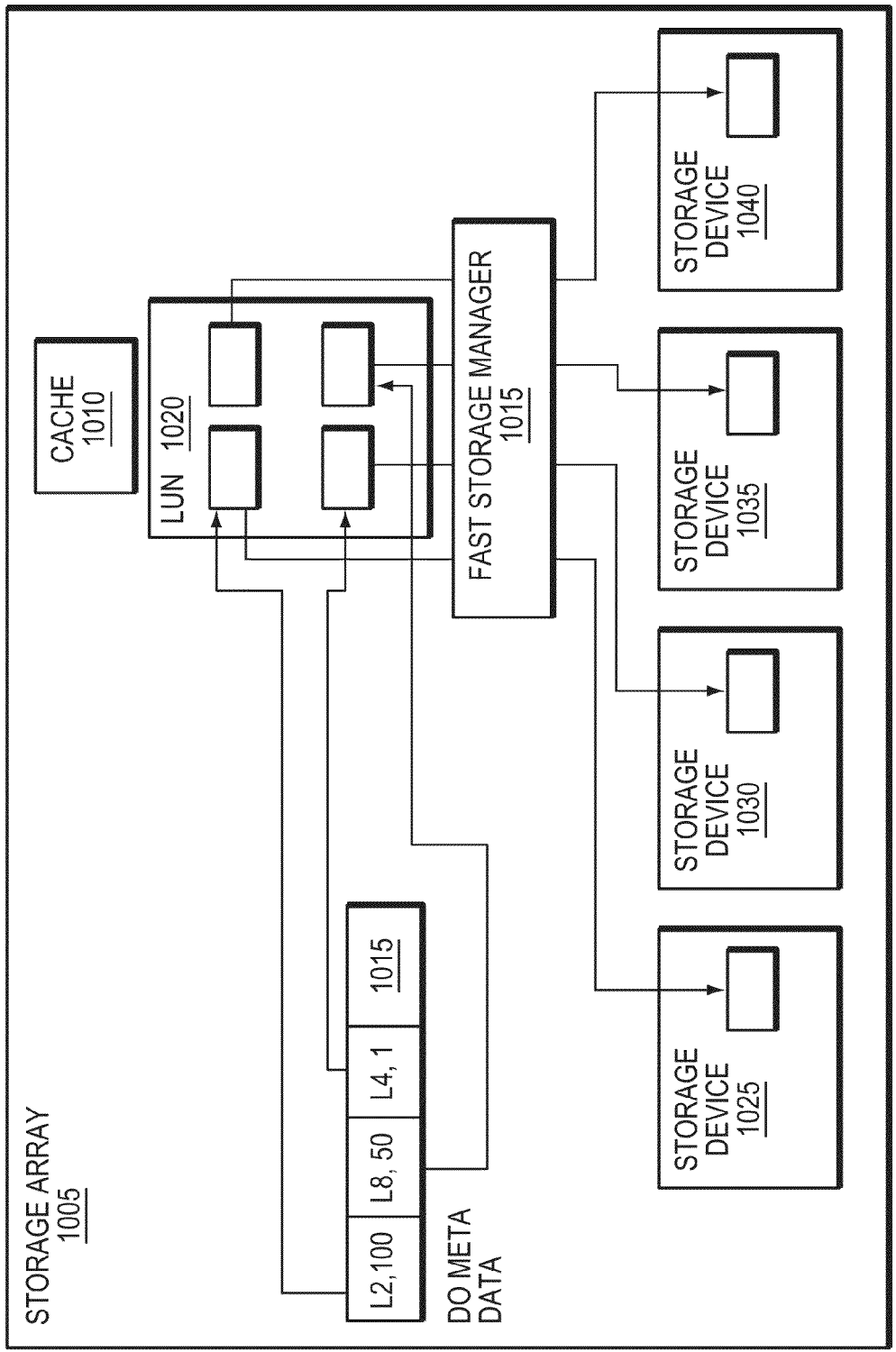
FIG. 10 is a simplified illustration of a storage array with tiers of storage devices and Do meta data, in accordance with an embodiment of the present disclosure.

Refer now to the example embodiment of FIG. 10. In the example embodiment of FIG. 10, Do data 1010 and Do meta data 1015 have been incorporated into a heat map indicate that memory locations L2, L8, and L4 will be accessed 100, 50, and 1 times respectively. In this embodiment, this data is stored on LUN 1020 and mapped to storage devices 1025, 1030, 1035, and 1040. In this embodiment, the storage devices 1025, 1030, 1035, and 1040 have different speeds, with storage device 1025 being a tier 1 or fast device and storage device 1040 being a slow or lower tier device.

Figure 11:
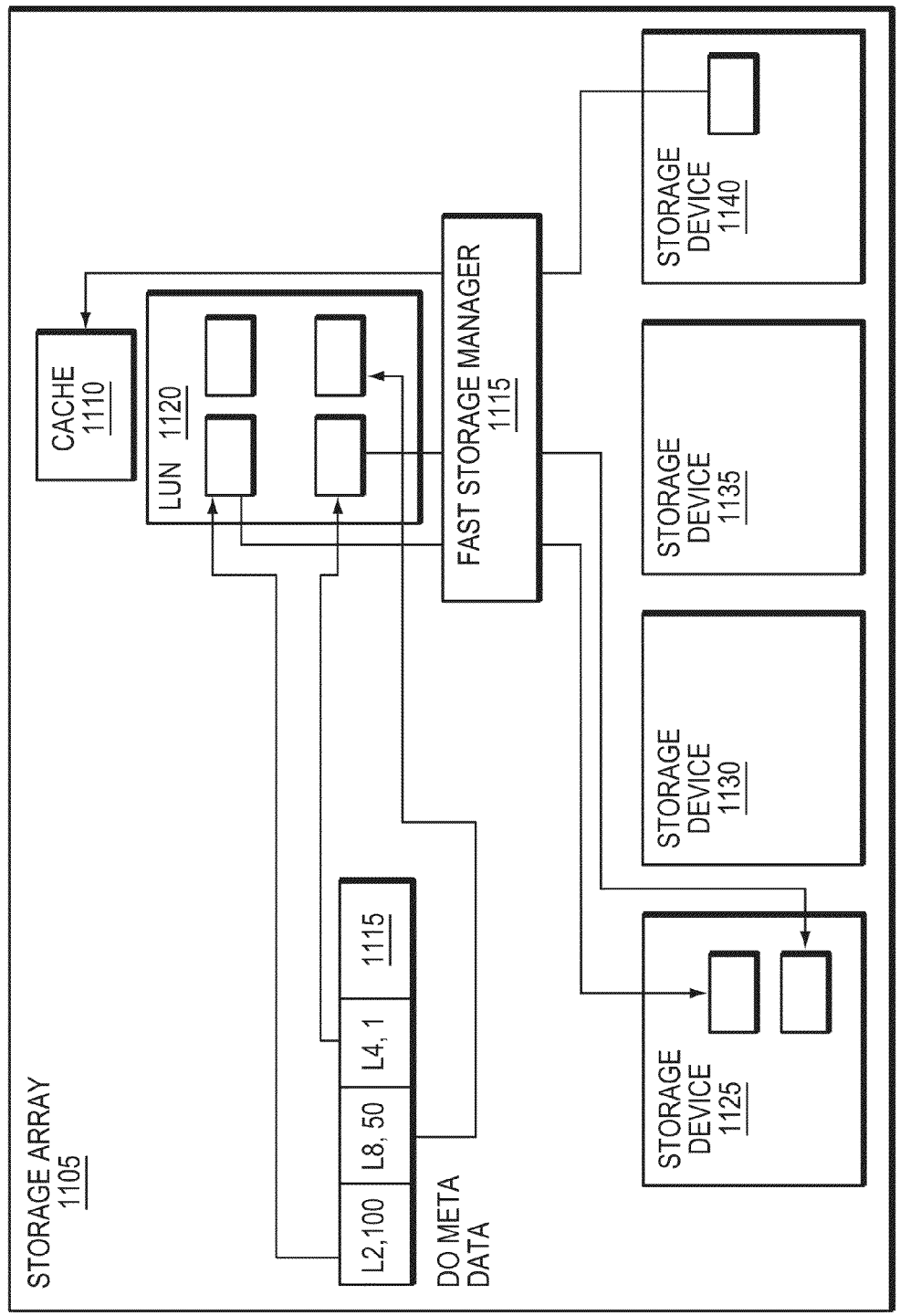
FIG. 11 is an alternative simplified illustration of a storage array with tiers of storage devices and Do meta data, in accordance with an embodiment of the present disclosure.

Refer now to the embodiments of FIGS. 7 and 10, 11. In the embodiments of FIG. 11, the metadata of FIG. 10 has been read (step 705), an IO structure has been created, which in this embodiment is a heat map (step 710), the IO structure has been sent to the storage (step 720), and the storage has moved the data based on the IO structure (step 730). In FIG. 11, the data corresponding to the locations L2 and L8 have been moved to Storage Device 1125, which is a higher tier storage device to enable quick access to these locations. The data corresponding to location L4, which is only accessed once, was not moved. In this embodiments, the data corresponding to location L4 was copied to the cache before the data was accessed to enable quicker access, but the location of the data was not moved of the slow storage tier.

In some embodiments, a heat map may be provided to the fast storage manager. In certain embodiments, the heatmap may be a map from a region in the disk to a number. In some embodiments, each region may be 1 MB and the heat may be an integer 0-255. In certain embodiments, for a storage of size 1 TB the list may have 1 M entries each of one bytes, where the most accessed regions have higher values. In certain embodiments, the number may be the number of times a region is access. In further embodiments, the number may be normalized as a region may be accessed more than 256 times.

Figure 12:
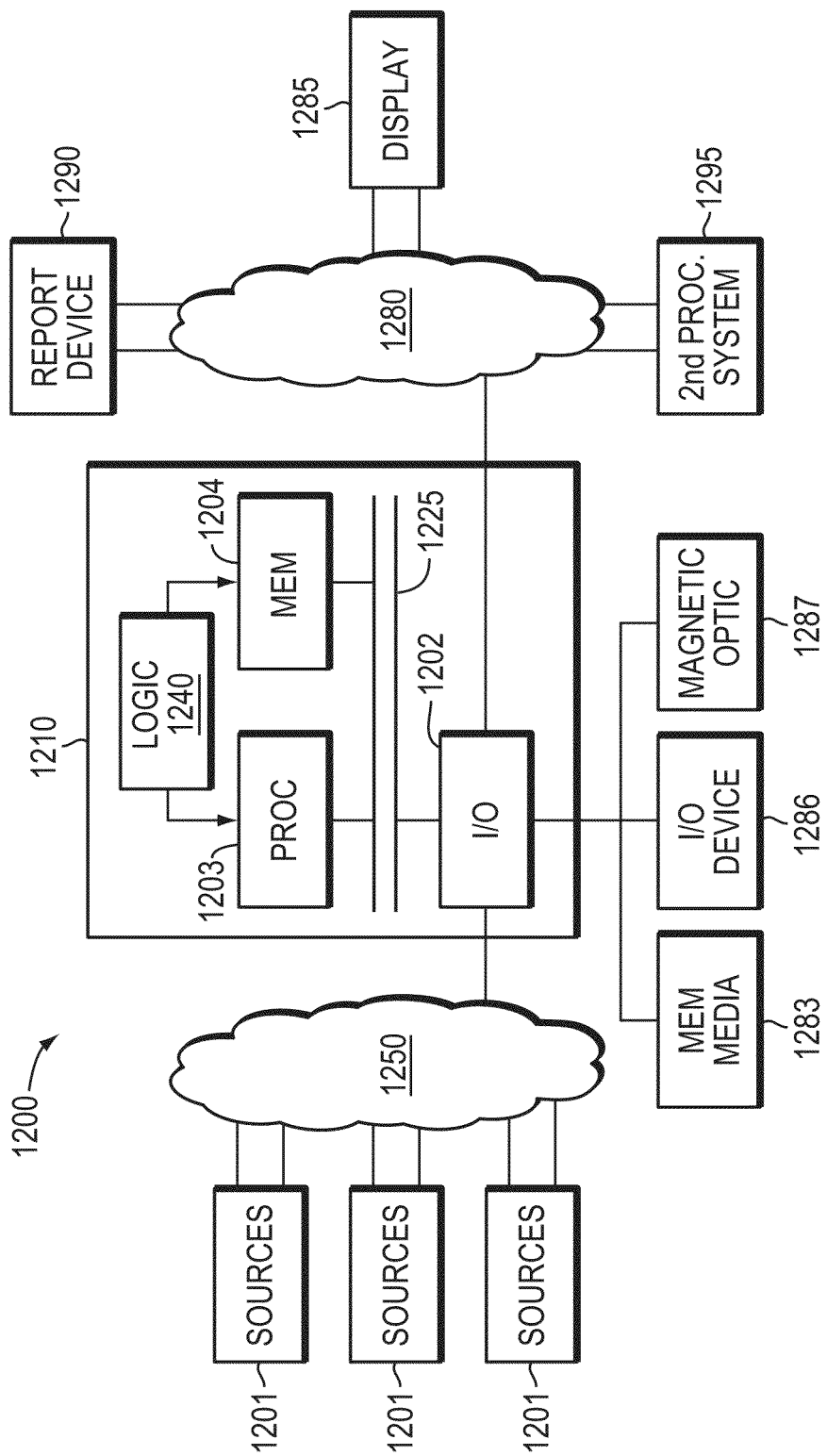
FIG. 12 is an example of an embodiment of an apparatus that may utilize the techniques described herein, in accordance with an embodiment of the present disclosure.
Figure 13:
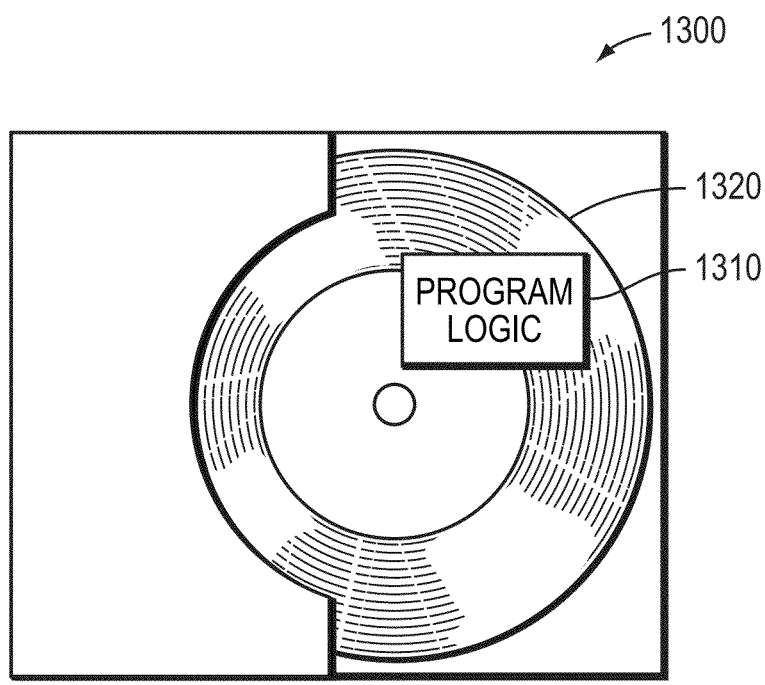
FIG. 13 is an example of an embodiment of a method embodied on a computer readable storage medium that may

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 12, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. FIG. 13 shows Program Logic 1310 embodied on a computer-readable medium 1530 as shown, and wherein the Logic is encoded in computer-executable code configured for carrying out the reservation service process of this invention and thereby forming a Computer Program Product 1300. Logic 1240 of FIG. 12 may be loaded into memory 1204 and executed by processor 1230. Logic 1240 may also be the same logic 1310 on computer readable medium 1330.

The logic for carrying out the method may be embodied as part of the aforementioned system, which is useful for carrying out a method described with reference to embodiments shown in, for example, FIG. 1 and FIG. 2. For purposes of illustrating the present invention, the invention is described as embodied in a specific configuration and using special logical arrangements, but one skilled in the art may appreciate that the device is not limited to the specific configuration but rather only by the claims included with this specification.

Although the foregoing invention has been described in some detail for purposes of clarity of understanding, it may be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. Thus it will be appreciated that, in addition to data replication systems, the optimal journaling policy of the present invention has widespread application to journaling systems including database systems and version control systems.

In the foregoing specification, the invention has been described with reference to specific exemplary embodiments thereof. It may, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A system for data replication, the system comprising:
   a first site, the first site comprising a logical storage medium, the logical storage medium mapped to tiered storage mediums;
   a journal, the journal comprising pending Input/Output (IO) data to the logical storage medium and metadata, the metadata containing information about the pending IO data for the logical storage medium; and
   computer-executable logic operating in memory, wherein the computer-executable program logic is configured for execution of:
   based on the metadata, creating a mapping of the pending IO data to the logical storage medium;
   notifying a fully automated storage tiering (FAST) storage manager of an expected IO storage pattern based on the metadata; wherein the FAST storage manager is enabled to change the mapping of the logical storage medium to the tiered storage mediums based on the expected IO storage pattern;
   and
   changing the mapping of the logical storage medium to the tiered storage mediums to optimize the pending IO data to the logical storage medium; wherein the FAST storage manager performs the changing of the mapping of the logical storage medium to the tiered storage medium; wherein the tiered storage mediums have different performance characteristics.

2. The system of claim 1, wherein the computer executable logic is further configured for execution of:
   determining an amount of journal lag corresponding to the time to perform the pending IO data in the journal on the logical storage medium based on the characteristics of the tiered storage mediums; and
   determining that the metadata corresponds to an IO amount greater or equal to the lag.

3. The system of claim 2 wherein the determined lag is large enough to impact the IO performance of the IO written to the tiered storage medium.

4. The system of claim 2 wherein the storage is notified of the journal and wherein the storage uses the journal structure to determine what data to prefetch.

5. The system of claim 1 wherein the computer executable logic is further configured for execution of:
   changing the mapping of the logical storage medium to the tiered storage medium to locate some of the pending IO in a cache of the first site.

6. The system of claim 1 wherein mapping of pending IO is a heat map.

7. The system of claim 1 wherein mapping of pending IO is a heat map.

8. A computer program product comprising:
a non-transitory computer readable medium encoded with computer executable program code for optimizing storage performance the code configured to enable the execution of:
based on metadata in a journal containing information about pending Input/Output (IO) to a logical storage medium, creating a mapping of the pending IO to the logical storage medium;
notifying a fully automated storage tiering (FAST) storage manager of an expected IO storage pattern based on the metadata; wherein the FAST storage manager is enabled to change the mapping of the logical storage medium to the tiered storage mediums based on the expected IO storage pattern; and
changing the mapping of the logical storage medium to tiered storage mediums corresponding to the logical storage medium to optimize the pending IO to the logical storage medium; wherein the FAST storage manager performs the changing of the mapping of the logical storage medium to the tiered storage medium; wherein the tiered storage mediums have different performance characteristics.

9. The program product of claim 8 wherein the executable program code is further configured for execution of:
determining an amount of lag in a journal storing the metadata based on the characteristics of the tiered storage mediums; wherein the lag corresponds to the time to perform the pending IO data in the journal on the logical storage medium; and
determining that the metadata corresponds to an IO amount greater or equal to the lag.

10. The program product of claim 9 wherein determined lag is large enough to impact the IO performance of the IO written to the tiered storage medium.

11. The program product of claim 9 wherein the storage is notified of the journal and wherein the storage uses the journal structure to determine what data to prefetch.

12. The program product of claim 8 wherein the executable program code is further configured for execution of: changing the mapping of the logical storage medium to the tiered storage medium to locate some of the pending IO in a cache of the first site.

13. The program product of claim 8 wherein mapping of pending IO is a heat map.

14. The computer program of claim 8 wherein mapping of pending IO is a heat map.

15. The computer program of claim 8 wherein the storage is notified of the journal and wherein the storage uses the journal structure to determine what data to prefetch.

16. A computer implemented method for data replication, the method comprising:
based on metadata in a journal containing information IO about pending Input/Output (IO) to a logical storage medium, creating a mapping of pending IO to the logical storage medium;
notifying a fully automated storage tiering (FAST) storage manager of an expected IO storage pattern based on the metadata; wherein the FAST storage manager is enabled to change the mapping of the logical storage medium to the tiered storage mediums based on the expected IO storage pattern; and
changing the mapping of the logical storage medium to tiered storage mediums corresponding to the logical storage medium to optimize the pending IO to the logical storage medium; wherein the FAST storage manager performs the changing of the mapping of the logical storage medium to the tiered storage medium; wherein the tiered storage mediums have different performance characteristics.

17. The computer implemented method of claim 16 wherein the method further comprising:
determining an amount of lag in a journal storing the metadata based on the characteristics of the tiered storage mediums; wherein the lag corresponds to the time to perform the pending IO data in the journal on the logical storage medium; and
determining that the metadata corresponds to an IO amount greater or equal to the lag.

18. The program product of claim 17 wherein determined lag is large enough to impact the IO performance of the IO written to the tiered storage medium.

19. The program product of claim 18 wherein the storage is notified of the journal and wherein the storage uses the journal structure to determine what data to prefetch.

20. The program product of claim 17 wherein the executable program code is further configured for execution of:
changing the mapping of the logical storage medium to the tiered storage medium to locate some of the pending IO in a cache of the first site.

21. The program product of claim 17 wherein mapping of pending IO is a heat map.

* * * * *